United States Patent [19]
Zdepski et al.

[11] Patent Number: 5,886,733
[45] Date of Patent: Mar. 23, 1999

[54] METHOD AND APPARATUS FOR SUCCESSIVE REFINEMENT OF BROADCASTED VIDEO FRAMES

[75] Inventors: Joel Walter Zdepski, Mountain View; Alain Michel Delpuch, Los Altos, both of Calif.

[73] Assignees: Sun Microsystems, Inc., Palo Alto, Calif.; Thomson Consumer Electronics, Inc., Indianapolis, Ind.

[21] Appl. No.: 649,781

[22] Filed: May 17, 1996

[51] Int. Cl.[6] .............................. H04N 7/14; H04N 7/12; H04N 11/02; H04N 11/04
[52] U.S. Cl. .............................. 348/13; 348/17; 348/423; 348/429
[58] Field of Search ................................. 348/13, 17, 12, 348/3, 461, 473, 6, 7, 10, 906, 423, 426, 429; 455/3.1, 3.2, 6.1; H04N 7/04

[56] References Cited

U.S. PATENT DOCUMENTS

| | | | |
|---|---|---|---|
| 4,414,580 | 11/1983 | Johnson et al. | 358/260 |
| 4,654,484 | 3/1987 | Reiffel et al. | 348/17 |
| 4,672,444 | 6/1987 | Bergen et al. | 348/384 |
| 4,870,497 | 9/1989 | Chamzas et al. | 348/426 |
| 5,233,654 | 8/1993 | Harvey | 380/20 |
| 5,408,270 | 4/1995 | Lim | 348/426 |
| 5,426,513 | 6/1995 | Scorse et al. | 358/433 |
| 5,448,568 | 9/1995 | Delpuch et al. | 348/14 |
| 5,504,933 | 4/1996 | Saito | 348/13 |
| 5,515,106 | 5/1996 | Chaney et al. | 348/416 |
| 5,801,753 | 9/1998 | Eyer et al. | 348/13 |

Primary Examiner—Bryan Tung
Assistant Examiner—Nhon T. Diep
Attorney, Agent, or Firm—Daniel Hopen; Peninsula Law Group

[57] ABSTRACT

An apparatus for successive refinement of video frames, and methods of operating the same result in reduced latency for downloading the video frames. The apparatus for transmitting video frames comprises a plurality of video frames encoded to provide a plurality of program modules. A first program module provides a first video frame. A second program module provides an enhancement to the first video frame. A cataloging resource which provides scheduling requests for transmission of the plurality of program modules requests the first program module and the second program module for transmission. An output driver which transmits program modules receives the scheduling requests from the cataloging resource for the first program module and the second program module and selects the first program module and the second program module for transmission to produce a higher quality first video frame.

21 Claims, 2 Drawing Sheets

METHOD AND APPARATUS FOR SUCCESSIVE REFINEMENT OF BROADCASTED VIDEO FRAMES

BACKGROUND OF THE INVENTION

1. Field of the Invention

The present invention generally relates to transmission of video frames and more particularly to direct broadcasting of the video frames in an interactive TV network.

2. Description of the Related Arts

Interactive television (TV) systems are known from for example U.S. Pat. No. 5,233, 654 (the '654 patent). The system described in the '654 patent includes a receiver having a computer with sufficient storage to store interactive programs. In order to make interactive TV less costly and therefore more attractive to consumer acceptance, it is desirable to keep storage requirements in the receiver to a minimum. This is achieved by regularly transmitting executable code for the desired applications rather than requiring that the applications be continuously stored in the receiver.

Audio and visual data are regularly broadcasted to provide data for associated applications stored in the receiver. Catalog applications are a particular type of interactive TV applications that can be downloaded and stored in the receiver. The catalog applications include a plurality of video frames as their associated data. The plurality of video frames represent a catalog for users to select particular items of interest. The catalog applications and the associated data are broadcasted at regular intervals. Once a catalog application is downloaded to the receiver, users download the plurality of video frames and browse through the video frames as they navigate through the catalog of the catalog application in search of the items of interest. Browsing through the plurality of video frames can be time consuming when there is substantial latency delay associated with downloading the plurality of video frames.

Particularly, at any one time there may be a multitude of interactive TV applications and their associated data being simultaneously transmitted to a multitude of users. The amount of bandwidth reserved for broadcasts of a particular interactive TV application and its associated data may become limited. Consequently, as increased numbers of users subscribe to the interactive TV system, the frequency of regular rebroadcasts of data for an associated catalog application is reduced. Users executing the catalog application experience increased latency delay as they browse through the plurality of video frames of the catalog application. Reducing latency delay in the operation of interactive TV applications is an important feature in the operation of the interactive TV system.

Therefore, it is desirable to provide catalog applications and their associated data, and a method of operating the same which reduce latency delay associated with downloading the catalog applications.

SUMMARY OF THE INVENTION

The present invention provides an apparatus for transmitting novel catalog applications for interactive TV and method for operating the same which result in reduced latency in the operation of the catalog applications. The novel catalog application is based on successive refinement of video frames associated with the catalog applications. Thus, according to one aspect of the invention, a broadcasting apparatus for transmitting video frames is provided. The broadcasting apparatus has a plurality of video frames encoded to provide a plurality of program modules. A first program module provides a first video frame. A second program module provides an enhancement to the first video frame. A cataloging resource which provides scheduling requests for transmission of the plurality of program modules requests the first program module and the second program module for transmission. An output driver which transmits program modules receives the scheduling requests from the cataloging resource for the first program module and the second program module and selects the first program module and the second program module for transmission to produce a high quality first video frame. The first program module provides a low quality first video frame that is small in size and can be transmitted quickly. Enough detail is provided to enable an end user to determine the contents of the first video frame without having to spend the time to download the enhancement for the high quality frame.

According to one aspect of the invention, the cataloging resource requests the first program module for transmission more frequently than the second program module. The output driver transmits the first program module providing the first video frame more frequently than the second program module providing the high quality first video frame. Requesting the second program module less frequently reduces the amount of data required for transfer and supports faster downloads of the catalog applications.

According to another aspect of the invention, the cataloging resource repeatedly requests the first program module and the plurality of program modules at a first predetermined interval for transmission. The output driver repeatedly transmits the first program module and the plurality of program modules at the first predetermined interval to provide the first video frame and the plurality of video frames.

According to yet another aspect of the invention, the cataloging resource requests the first program module, the second program module, and a plurality of program modules for transmission. The output driver transmits the first program module, and the second program module, and the plurality of program modules to provide the high quality first video frame and the plurality of video frames.

According to another aspect of the invention, the cataloging resource repeatedly requests the first program module, and the second program module, and a plurality of program modules at a second predetermined interval for transmission. The output driver repeatedly transmits the first program module, and the second program module, and the plurality of program modules at the second predetermined interval to provide a plurality of video frames. Thus, the amount of regularly broadcasted data is reduced by not transmitting the second program module as frequent as the first program module which relinquishes bandwidth for more frequent rebroadcasting of the catalog applications. More frequent rebroadcasts reduce the interval between the broadcasts and further reduce the latency of downloading the video frames.

An apparatus and method for broadcasting successive refinement of video frames are provided by first transmitting a low quality frame that is recognizable more frequently than an enhancement to the low quality frame which applied in conjunction with the low quality frame produces a high quality frame. Latency from downloading the video frames is reduced by not having to download the high quality frame while navigating through the series of frames of a catalog application.

Other aspects and advantages of the present invention can be seen upon review of the figures, the detailed description, and the claims which follow.

DETAILED DESCRIPTION OF THE INVENTION

The invention will be described with respect to the Figs. in which FIG. 1 generally shows a digital transmission system, as for example a direct broadcast satellite system. It is presumed that a single satellite transponder accommodates a plurality of respective TV programs in time division multiplexed format.

Figure 1:
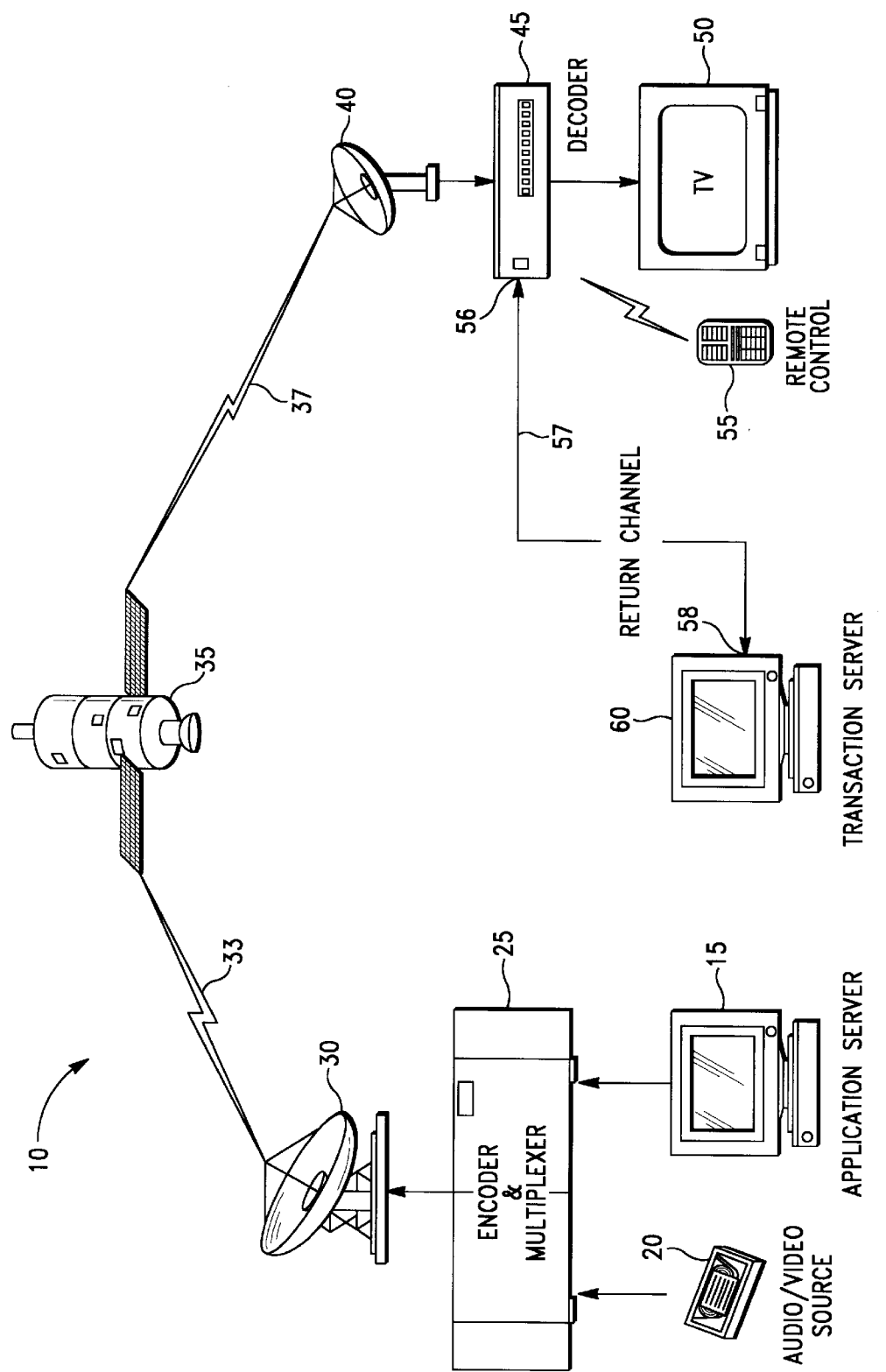
FIG. 1 illustrates a system level block diagram for digital transmissions in a direct broadcast satellite system.

Referring to FIG. 1, the direct broadcast satellite system 10 includes a broadcast center 12, service provider 13, and an end user 14. The broadcast center 12 includes an application server 15, an audio/video source 20, encoder and multiplexer 25, and satellite transmitter 30. The application server 15 controls execution of interactive TV applications which are loaded into the logic circuits of the application server 15 to perform a series of specifically identified operations dictated by the interactive TV applications.

The interactive TV applications include associated audio and video information sources 20 The application server 15 synchronizes the interactive TV applications and the associated audio and video information sources 20 into transport packets that provide inputs to the encoder and multiplexer 25. The encoder and multiplexer 25 receives the transport packets and encodes the transport packets for transmission. Satellite transmitter 30 time-multiplexes the transport packets and transmits the transport packets as upload signal 33 to satellite 35.

The broadcast center 12 is described in detail in issued U.S. Pat. No. 5,448,568 entitled "System of Transmitting an Interactive TV Signal" assigned to Thomson Consumer Electronics, Inc. issued Sep. 5, 1995. The U.S. Pat. No. 5,448,568 is herein incorporated by reference in its entirety.

Satellite 35 receives the upload signal 33 and transmits download signal 37 to end user 14. The end user 14 includes satellite dish 40, decoder 45, TV 50, remote control 55, and return channel 57. Satellite dish 40 receives the download signal 37 and provides an output to decoder 45. The decoder 45 includes a software operating system loaded into the logic circuits of the decoder 45 that performs a series of steps to control the operations of the decoder 45. The decoder 45 receives the download signal 37 from satellite dish 40 and decodes the transmitted interactive TV application and its associated audio and video information 20. The decoder 45 executes the interactive TV application and provides audio and video outputs to TV 50.

Remote control 55 provides inputs to the decoder 45 to select execution of other interactive TV applications for output to TV 50. The decoder 45 includes an input/output port 56 that couples to return channel 57 for communication to service provider 13.

The service provider 13 includes a transaction server 60 to provide local interaction with the end user 14. The transaction server 60 includes an input/output port 58 which couples to return channel 57. The transaction server 60 provides monitoring of transactions performed by the end user 14 and updating of the software operating system for the decoder 45 via return channel 57. The return channel 57 may be a telephone line or a cable line.

Figure 2:
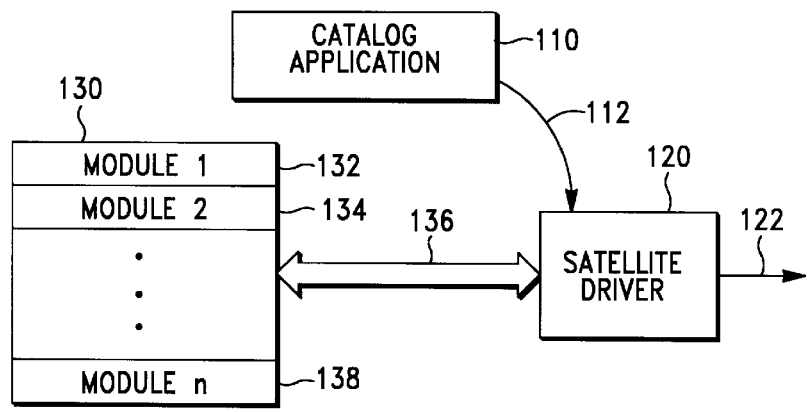
FIG. 2 illustrates a block diagram of the application server initiating transmissions of a series of video frames for the direct broadcast satellite system.

FIG. 2 illustrates a block diagram of the application server 15 initiating transmissions of a series of video frames for the direct broadcast satellite system 10. Catalog application 110 provides cataloging resources that are loaded into the logic circuits of the application server 15 to perform a series of specifically identified operations to upload a series of video frames for broadcast to the end user 14. The catalog application 110 schedules requests to satellite driver 120 for a series of video frames for transmission. The satellite driver 120 receives the scheduling requests on line 112. In the present embodiment, driver 120 is for transmission to a satellite. However, other embodiments not based on satellite systems will use drivers that correspond to an associated system such as telco drivers for telco transmissions and cable drivers for cable transmissions.

Satellite driver 120 in response to the scheduling requests of the catalog application 110 selects video frames from frame module cache 130 on line 136 and submits the video frames for output on line 122. The frame module cache 130 includes a plurality of modules ranging from module 1 132, module 2 134 to module n 138 that are encoded for transmission by the satellite driver 120. Each module provides a particular video frame. Thus, the frame module cache 130 provides storage for a plurality of video frames.

The catalog application 110 repeatedly schedules the series of video frames for transmission by the satellite driver 120 at predetermined intervals. Thus, the series of video frames are broadcasted to the end user 14 at regular intervals.

Figure 3:
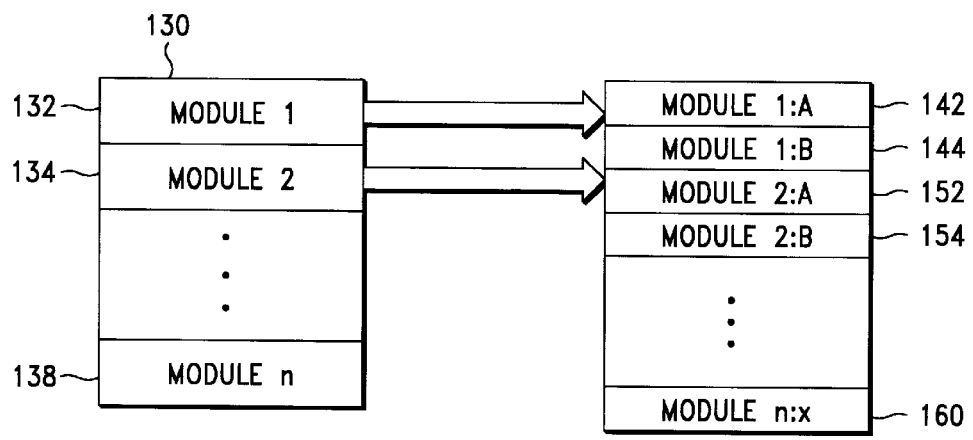
FIG. 3 illustrates a modification of the frame module cache according to the present invention.

FIG. 3 illustrates a modification of the frame module cache 130. Enhanced frame module cache 140 illustrates a transformed frame module cache 130. The enhanced frame module cache 140 includes a plurality of modules: Module 1:A 142, module 1:B 144, module 2:A 152, and module 2:B 154 through module n:X 160. Similar to the modules 132, 134, and 138 of the frame module cache 130, the modules 142, 144, 152, 154, and 160 of the enhanced frame module cache 140 include encoding that enables the satellite driver 120 to select and transmit the modules. Module 1 132 of the frame module cache 130 is encoded to include module 1:A 142 and module 1:B 144 of the enhanced frame module cache 140. Thus, the encoded video frame of module 1 132 of the frame module cache 130 is represented by module 1:A 142 and module 1:B 144 of the enhanced frame module cache 140.

According to the present invention, decoder 45 includes an MPEG-2 (Moving Pictures Experts Group) video decoder. The modules 1:A 142 and 2:A 152 represent encoded intra-frames (I-frames), and the modules 1:B 144 and 2:B 154 represent encoded predicted frames (P-frames). The I-frames and P-frames are defined under ISO/IEC 13818-2 (International Organization for Standardization /International Electro-technical Commission.

Module 1:A 142 of the enhanced frame module cache 140 provides a low quality version of the video frame represented by module 1 132 of the frame module cache 130. Module 1:B 144 in conjunction with module 1:A 142 of the enhanced frame module cache 140 produces a high quality picture similar to the video frame produced from module 1 132 of the frame module cache 130. The low quality version of the video frame provides adequate picture quality for browsing and is smaller in size than the video frame represented by module 1 132 of the frame module cache 130. Reducing the amount of data to be transmitted reduces the latency for receiving a particular video frame. Furthermore, additional bandwidth recovered from the shorter broadcasts is reallocated to decrease the broadcast intervals between transmission of the series of video frames.

Referring again to FIG. 3, module 2 of the frame module cache 130 is also encoded as two separate modules represented by module 2:A 152 and module 2:B 154 of the enhanced frame module cache 140. Module 2:A 152 provides a low quality version of the video frame represented by module 2 134 of the frame module cache 130. Module 2:B 154 in conjunction with module 1 142 of the frame module cache 140 produce a high quality picture similar to the video frame produced from module 2 142. Thus, multiple modules of the frame module cache 130 are encoded to support low quality video frames and enhanced high quality video frames which increase the performance of downloading catalog applications and their associated video frames.

Figure 4:
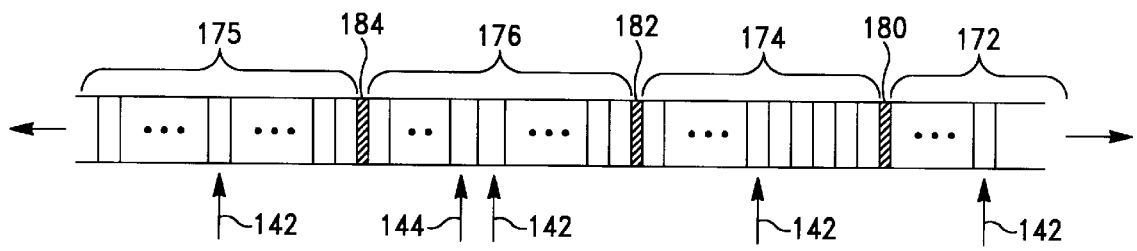
FIG. 4 illustrates a broadcast data stream of a series of video frames from the frame module cache that are repeatedly transmitted by the satellite transmitter according to the present invention.

FIG. 4 illustrates a broadcast data stream 170 of a series of video frames from the enhanced frame module cache 140 that are repeatedly transmitted by the satellite transmitter 30. Broadcasts from other interactive TV applications 180, 182, and 184 (not drawn to scale) interleave repeated broadcasts 172, 174, 176, and 178 of the series of video frames. The repeated broadcast 172 includes module 1:A 142 and does not include module 1:B 144 of the enhanced frame module cache 140. The repeated broadcast 174 includes module 1:A 142 and does not include module 1:B 144 of the enhanced frame module cache 140. Not until the repeated broadcast 176 does a repeated broadcast includes both module 1:A 142 and module 1:B 144 of the enhanced frame module cache 140. The repeated broadcast 178 includes module 1:A 142 and does not include module 1:B 144 of the enhanced frame module cache 140. Thus, module 1:A 142 is transmitted more frequently at a first predetermined interval than module 1:B 144 of the enhanced frame module cache 140 which is transmitted at a second predetermined interval.

Encoding the module 1 132 of the frame module cache 130 into the module 1:A 142 and the module 1:B 144 enables transmission of a partial video frame of low quality. The low quality frame supports faster transmission of the video frames and faster browsing of the video frames by the end user 14. The transmission of module 1:B 144, which occurs less frequently than the transmission of module 1:A 142, produces a high quality picture when combined with module 1:A 142. Thus, instead of transmitting a series of high quality frames which contains more data and requires more time for transmission, low quality small data frames are transmitted to support faster transmission of the frames. The end user 14 experiences less latency as the video frames are downloaded and displayed faster on the TV 50.

If end user 14 desires more information not produced in the low quality picture, the end user 14 waits for module 1:B 144 to be received which in conjunction with the received module 1:A 142 produce a high quality picture. If end user 14 determines after receiving module 1:A 142 that the information displayed on the TV 50 is not what the end user 14 desires, the end user 14 selects another video frame without having to wait for the high quality picture to be downloaded and displayed. Thus, by having multiple modules to represent a particular video frame, the latency for receiving a series of video frames is reduced and the end user 14 can speedily browse through the series of video frames.

Accordingly, an apparatus for successive refinement of video frames has been provided. The latency associated with receiving video frames is reduced by having multiple modules represent a particular frame. Low quality faster transmitting frames are transmitted more frequently while supplements for the higher quality picture are transmitted less frequently. The amount of time required for the transmission of each broadcast set is also reduced. Reducing the amount of time for each broadcast set provides more time for rebroadcasts which decreases the time interval between each broadcast set. As each broadcast set is transmitted more frequently, the latency for receiving the frame set is further reduced. Although the embodiment for the successive refinement of video frames has been disclosed with reference to interactive TV applications and a satellite transceiving network, variations of the successive refinement of video frames according to the present invention are applicable in other applications where latency for receiving data is an issue.

The foregoing description of a preferred embodiment of the invention has been presented for purposes of illustration and description. It is not intended to be exhaustive or to limit the invention to the precise forms disclosed. Obviously, many modifications and variations will be apparent to the practitioners skilled in the art. It is intended that the scope of the invention be defined by the following claims and their equivalents.

what is claimed is:

1. A method of broadcasting a plurality of video frames to a catalog application in an interactive TV system comprising the steps:

encoding the plurality of video frames to provide a plurality of program modules;

organizing the plurality of program modules to provide a plurality of video frames;

selecting a first program module to provide a first video frame;

transmitting the first program module in series with the first program module to broadcast the first video frame;

selecting a second program module to provide an enhancement to the first video frame less frequently than the first program module;

transmitting the second program module to broadcast the enhancement to the first video frame; and enhancing the first video frame to provide a higher quality first video frame.

2. The method of broadcasting a plurality of video frames according to claim 1 further comprising the step scheduling a series of program modules for transmission.

3. The method of broadcasting a plurality of video frames according to claim 2 further comprising the step encoding the series of program modules for transmission.

4. The method of broadcasting a plurality of video frames according to claim 2 further comprising the step repeatedly transmitting the series of program modules at predetermined intervals.

5. The method of broadcasting a plurality of video frames according to claim 4, wherein the step repeatedly transmitting the series of program modules includes transmitting the first program module.

6. The method of broadcasting a plurality of video frames according to claim 5, wherein the step transmitting the second program module occurs less frequently than the step transmitting the first program module.

7. The method of broadcasting a plurality of video frames according to claim 1, wherein the step transmitting the first program module produces a low quality first video frame.

8. A broadcasting apparatus for transmitting video frames to a catalog application in an interactive TV system comprising:
- a plurality of video frames encoded to provide a plurality of program modules;
- a first program module which provides a first video frame;
- a second program module which provides an enhancement to the first video frame;
- a cataloging resource which provides scheduling requests for transmission of the plurality of program modules requests the first program module and the second program module for transmission; and
- an output driver which transmits program modules receives the scheduling requests from the cataloging resource for the first program module and the second program module and selects the first program module more frequently than the second program module for transmission in series to produce a higher quality first video frame.

9. The broadcasting apparatus according to claim 8, wherein the cataloging resource requests the first program module for transmission more frequently than the second program module.

10. The broadcasting apparatus according to claim 9, wherein the output driver transmits the first program module providing the first video frame more frequently than the second program module providing the high quality first video frame.

11. The broadcasting apparatus according to claim 10, wherein:
- the cataloging resource requests the first program module and the plurality of program modules for transmission; and
- the output driver transmits the first program module and the plurality of program modules to provide the first video frame and the plurality of video frames.

12. The broadcasting apparatus according to claim 11, wherein:
- the cataloging resource repeatedly requests the first program module and the plurality of program modules at a first predetermined interval for transmission; and
- the output driver repeatedly transmits the first program module and the plurality of program modules at the first predetermined interval to provide the first video frame and the plurality of video frames.

13. The broadcasting apparatus according to claim 10, wherein:
- the cataloging resource requests the first program module, the second program module, and a plurality of program modules for transmission; and
- the output driver transmits the first program module, and the second program module, and the plurality of program modules to provide the higher quality first video frame and the plurality of video frames.

14. The broadcasting apparatus according to claim 11, wherein:
- the cataloging resource repeatedly requests the first program module, and the second program module, and a plurality of program modules at a second predetermined interval for transmission; and
- the output driver repeatedly transmits the first program module, and the second program module, and the plurality of program modules at the second predetermined interval to provide a plurality of video frames.

15. The broadcasting apparatus according to claim 8, wherein the first program module provides a low quality first video frame.

16. A broadcasting system for transmitting video frames to a catalog application in an interactive TV network comprising:
- a first program module encoded to provide a first video frame;
- a second program module encoded to provide an enhancement to the first video frame;
- a cataloging resource which schedules requests for transmission of the first program module and the second program module;
- a satellite driver which receives requests from the cataloging resource and selects the first program module and the second program module for transmission; and
- a satellite transmitter which transmits in series and more frequently the first program module than the second program module to provide a first video frame and an enhancement to the first video frame to produce a higher quality first video frame.

17. The broadcasting system according to claim 16 further comprising a plurality of program modules encoded to provide a plurality of video frames and wherein:
- the cataloging resource schedules the first program module and the plurality of program modules for transmission;
- the satellite driver selects the first program module and the plurality of program modules; and
- the satellite transmitter transmits the first program module and the plurality of program modules to provide the first video frame and the plurality of video frames.

18. The broadcasting system according to claim 17 wherein:
- the cataloging resource repeatedly schedules, the satellite driver repeatedly selects, and the satellite transmitter repeatedly transmits the first program module and the plurality of program modules to repeatedly broadcast at a first predetermined interval the first video frame and the plurality of video frames.

19. The broadcasting system according to claim 17 wherein:
- the cataloging resource schedules the second program module for transmission;
- the satellite driver selects the second program module; and
- the satellite transmitter transmits the second program module to provide the high quality first video frame.

20. The broadcasting system according to claim 19, wherein:
- the cataloging resource repeatedly schedules, the satellite driver repeatedly selects, and the satellite transmitter repeatedly transmits the first program module, the second program module, and the plurality of program modules to repeatedly broadcast at a second predetermined interval the high quality first video frame and the plurality of video frames.

21. The broadcasting system according to claim 19 wherein:
- the cataloging resource requests the first program module more frequently than the second program module;
- the satellite driver selects the first program module more frequently than the second program module; and
- the satellite transmitter transmits the first program module more frequently than the second program module to broadcast more first video frames.

* * * * *